United States Patent [19]

Davis

[11] 4,120,332
[45] Oct. 17, 1978

[54] AUTOMATIC DETACHABLE CHARGING HEAD FOR PRESSURE TANK

[76] Inventor: Elisha C. Davis, 1344 Davis Ave., Enumclaw, Wash. 98022

[21] Appl. No.: 724,051

[22] Filed: Sep. 16, 1976

[51] Int. Cl.$^2$ .............................................. B65B 3/26
[52] U.S. Cl. ..................................... 141/197; 141/18
[58] Field of Search ................... 42/1 G, 1 Z; 102/39; 141/2, 3, 4, 18, 19, 98, 197, 311 R, 392; 180/736, 737; 222/3, 399

[56] References Cited

U.S. PATENT DOCUMENTS

| | | | |
|---|---|---|---|
| 2,180,273 | 4/1965 | Hebenstreit | 141/4 |
| 3,232,485 | 2/1966 | Wilson | 141/18 X |
| 3,749,282 | 7/1973 | Day et al. | 180/737 |

*Primary Examiner*—Richard E. Aegerter
*Assistant Examiner*—Frederick R. Schmidt
*Attorney, Agent, or Firm*—Joseph E. Rusz; Arsen Tashjian

[57] ABSTRACT

An automatic detachable charging head for use with a check valve in operative communication with the charging head to allow gases therefrom to flow into the tank and a pressure safety release mechanism to prevent over pressurization. The detachable charging head fits onto the pressure storage container and includes a cartridge containing gas producing material. In the automatic embodiment of the invention, the detachable charging head includes a belt for feeding the cartridges into a firing breech contained therein and a pressure sensing switch in the pressure tank for causing the belt to stop feeding and the cartridges to stop firing when the tank pressure reaches a predetermined desired value.

3 Claims, 2 Drawing Figures

AUTOMATIC DETACHABLE CHARGING HEAD FOR PRESSURE TANK

STATEMENT OF GOVERNMENT INTEREST

The invention described herein may be manufactured and used by or for the Government for governmental purposes without the payment of any royalty thereon.

BACKGROUND OF THE INVENTION

This invention relates to an automatic charging head for use with a pressurized storage tank and, more particularly, the invention is concerned with providing a detachable charging head which fits onto the pressurized container and includes an automatic feed mechanism for supplying and firing cartridges in the charging head until the desired pressure is reached at which time a pressure responsive means operates to interrupt the firing of the cartridges.

Heretofore, it has been common practice to provide a source of pressurized gas by filling a tank to the desired pressure and withdrawing the gases as needed. Many different systems have been devised for filling the tank to obtain the required pressure at the output line. One system includes the firing of a cartridge which contains a combustible gas producing material. When the cartridge is discharged, a chamber is pressurized and the gases therein flow through a check valve into the main tank.

In one pressure tank which utilizes a cartridge discharge to produce the pressurized gases, the charging head and the tank are fabricated as an integral unit, that is, the cartridge firing mechanism is permanently attached to the tank base. This means that each tank must be provided with a separate cartridge firing system. A better and more efficient system would be one where a single charging head could be utilized to service a plurality of tanks. Also it would be most desirable to provide an automatic or semi-automatic charging head wherein the cartridges could be automatically fed into a breech assembly and fired until the desired pressure is reached in the tank at which time a pressure sensitive element would operate to stop further pressurization by halting the automatic feeding mechanism. The hereinafter described automatic detachable charging head effectively overcomes the aforementioned disadvantages and provides a pressurized tank system having the desired features and advantages.

SUMMARY OF THE INVENTION

The present invention is concerned with providing an automatic detachable charging head suitable for attachment to a pressure tank wherein a cartridge is discharged to produce pressurized gases which enter the tank through a check valve. The charging head which can be removed after the tank is pressurized, can be used to pressurize other tanks in a similar manner. In the automatic charging head, the cartridges are fed on a belt to a breech chamber where they are fired. A pressure sensitive switching in the tank operates to interrupt the automatic firing system when the tank reaches the predetermined desired pressure.

Accordingly, it is an object of the invention to provide a detachable charging head for use with a pressure tank wherein the charging head can be removed and reinstalled at random. One charging head can be alternately used with a number of different pressure containers.

Another object of the invention is to provide an automatic charging head for attachment to a pressure container. The cartridges which produce the pessurized gas are fed into the charging head on a belt and fired until the desired pressure is reached in the tank. A safety device in the form of an electrical or pressure actuated device operates to interrupt the firing of cartridges when the desired pressure is reached.

Still another object of the invention is to provide a pressure tank for use with an automatic detachable charging head. A safety pressure release mechanism is provided in the tank for preventing the over-pressurization of the tank. An additional safety device which functions at a lower pressure, operates to lock the firing mechanism in any suitable manner and prevent further pressurization of the tank.

A further object of the invention is to provide a pressure sensing switch in the pressure container for use with an electrically opeated "stop firing" system. An electrical cable is used with the pressure sensing switch to activate an electrical solenoid on the charging/firing breech to interrupt the bolt feeding mechanism.

A still further object of the invention is to provide a pressure release switch for use with a pressure operated "stop firing" system. Pneumatic hose and/or tubing is used with the pressure release switch to carry pressurized gas to the "stop firing" device and thereby cause the cartridge feed mechanism to be interrupted.

These and other objects, features and advantages will become more apparent after considering the following detailed description taken in conjunction with the annexed drawings and appended claims.

DESCRIPTION OF PREFERRED EMBODIMENTS

Figure 1:
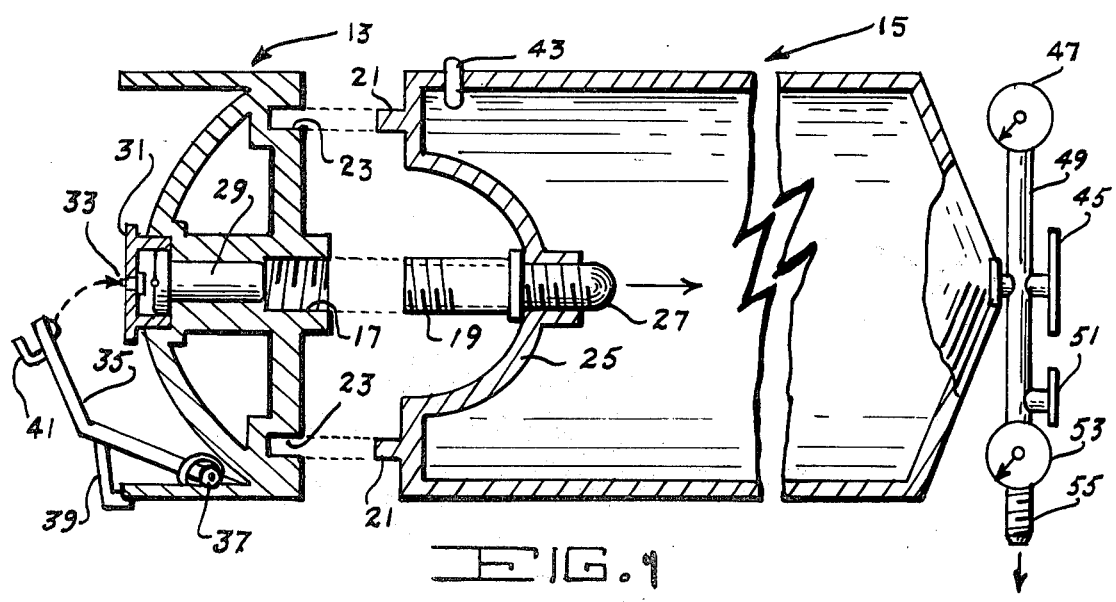
FIG. 1 is a side view in partial section of a pressure tank with a detachable charging head according to the invention showing the cartridge in position.

Referring now to FIG. 1, the detachable charging head 13 is designed to be attached to the pressure container or tank 15 by the engagement of the threaded opening 17 in the charging head 13 with a tubular threaded extension 19 on the pressure tank 15. An alignment member 21 extending from the rearward wall of the tank 15 fits into a corresponding alignment groove 23 in the forward wall of the charging head 13. A curved, preferably hemispherical, wall 25 extends inwardly from the rear of the tank 15. A check valve 27 is threadably attached to the forward control portion of the wall 25 to allow gases which flow through the tubular extension 19 to enter the tank 15 and to prevent gases in the tank 15 from flowing back through the valve 27.

A charging cartridge 29 is positioned in the charging head 13. When the tubular extension 19 is in threaded engagement with the opening 17, the gases discharged from the forward end of the charging cartridge 29 enter the tubular extension 19, pass through the check valve 27 and enter the interior of the tank 15. The rearward end of the cartridge 29 with the exposed primer affixed thereon is disposed so as to be slightly below the rear surface of the charging head 13. A closure cap 31 having a firing pin 33 slidably positioned in the center thereof is disposed over the rearward end of the cartridge 29. The firing pin 33 is in alignment with the primer in the cartridge 29 so that a blow from the firing pin 33 will cause the primer of the cartridge 29 to explode. In practice, the firing pin 33 is spring tensioned to the rear in order to keep the firing pin 33 in a counter sunk retainer or slot and away from the primer of the cartridge 29. This effectively prevents the accidental firing of cartridge 29 in case the tank 15 is dropped during handling with an unfired cartridge 29 inserted and closure cap 31 installed.

A spring loaded striker 35 is pivotably attached to the charging head 13 by means of the spring biased pivot member 37 which urges the striker 35 to move clockwise. A striker latch 39 holds the striker 35 under load after being pulled back by the handle 41 to the loader position. The cartridge 29 can now be fired by releasing the striker 35.

A safety pressure release valve 43 which may be in the form of blowout plug, is installed in wall of the tank 15 to prevent overpressurization with the resultant dangers of bursting. A master control valve 45 is operatively connected to the forward wall of the main storage tank 15 for controlling the flow of pressurized gas from the interior of the tank 15. A tank pressure gauge 47 is attached to the line 49 to indicate the pressure in the interior of the main tank 15 and a pressure regulating valve 51 along with a gauge 53 to indicate the outlet pressure is attached in the tank outlet line 55.

Figure 2:
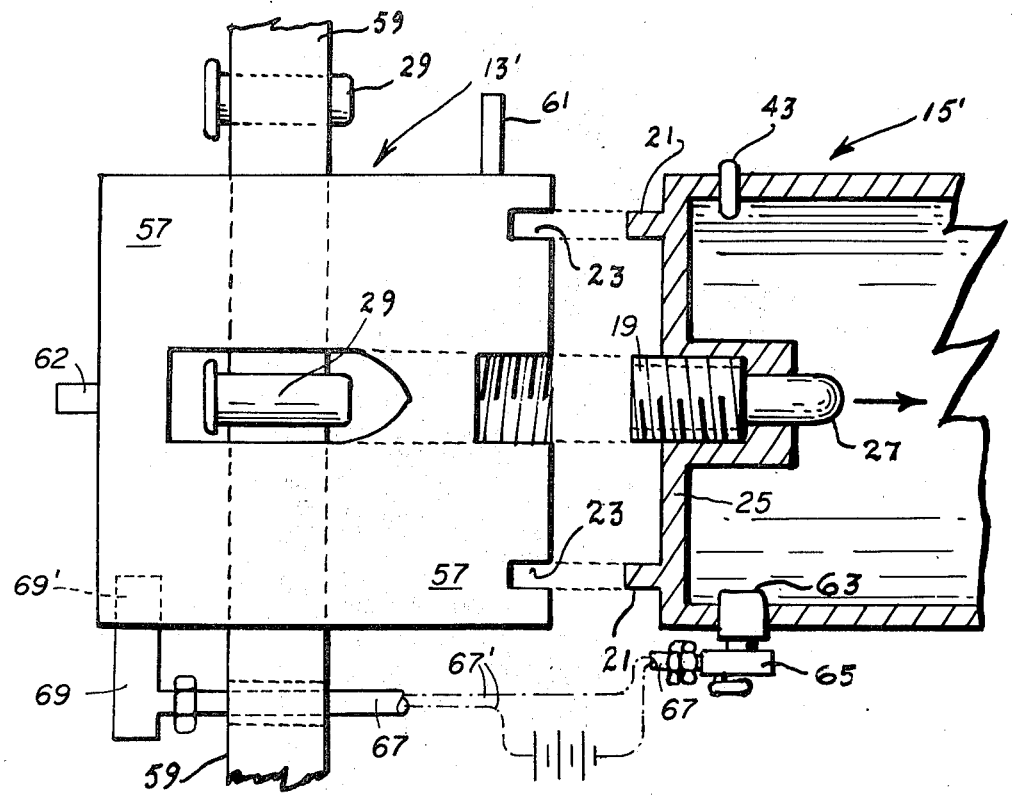
FIG. 2 is a top view of an automatic charging head with the pressure tank in partial section showing the pressure sensing switch and connector for interrupting the feeding mechanism at a predetermined tank pressure. de

Referring now to FIG. 2, there is shown an automatic or semi-automatic charging head 13' designed to be attached to a suitable pressure container 15'. The cartridges 29 are supplied to the firing breech 57 by means of a belt 59. A cocking bolt 61 to set the trigger 62 on the firing breech 57 in position for firing is disposed thereon and extends outwardly for easy access. Besides the safety pressure release valve 43, there is positioned in the wall of the tank 15' a pressure sensing switch and connector 63. The pressure switch 63 can be designed to operate either electrically or pneumatically to cause the automatic charging head 13' to stop firing. If electrical "stop firing" mechanism is used, an electrical solenoid 69' is installed on the firing breech 57 to interrupt the bolt feeding or cartridge carrier mechanism. An electrical cable 67' operatively connects the pressure sensing switch 63 to the electrical solenoid 69' on the firing breech 57 and the feeding stops when the pressure at switch 63 reaches the proper level. The electrical power may be supplied by any suitable source that will operate the electrical solenoid 69' when pressure sensing switch is activated.

If pneumatic "stop firing" mechanism is used, a pneumatic hose or tubing 67 connects the release switch 63 to the firing breech 57 and the feeding mechanism is interrupted when the desired pressure is reached. This could be accomplished by providing a pressure operated device 69 designed to lock the feed mechanism. For example, the switch 63 could activate a plunger to prevent the cartridge feed mechanism from operating thereby preventing the discharge of additional cartridges. This pressure sensing feature functions at lower pressures while the safety pressure release system functions at higher pressure. The pressure sensing/release switch 63 for the low pressure system may be located in any suitable position. A manually operated control valve 65 is positioned in the pneumatic hose/tubing line 67 to prevent pressure from escaping out the pressure release switch 63 when connecting/disconnecting the hose/tubing line used to link the pressure release switch 63 with the pressure operated, stop firing device that interrupts the cartridge feed mechanism of the automatic charging head. The safety lock/preventive firing mechanism 69 is depicted schematically on the drawings of the automatic charging head. It could be installed at any suitable location to accomplish the interruption of the bolt feeding mechanism.

Although the invention has been illustrated in the accompanying drawing and described in the foregoing specification in terms of preferred embodiments thereof, the invention is not limited to these embodiments or to the particular configuration shown and described. Also, it should be noted that certain changes, modifications and substitutions can be made, particularly with respect to the positioning of the various valves and gauges without departing from the true spirit and scope of the appended claims.

Having thus set forth the nature of my invention what I claim and desire to secure by Letters Patent of the United States is:

1. In combination, a detachable charging head and pressure tank having a check valve in operative communication with the charging head to allow gases therefrom to flow into the tank and a safety pressure release mechanism to prevent overpressurization, said detachable charging head comprising a charging cartridge containing a combustionable material suitable for producing gases positioned in the central area of said charging head, means for threadably attaching said charging head to said pressure tank, means for axially aligning said charging head and said pressure tank, and means for filling the pressure tank by firing said charging cartridge including an automatic charging head comprising a firing breech with a trigger attached thereto, a feed belt for supplying charging cartridges to said firing breech, and a cocking bolt on said firing breech for setting the trigger in position for firing to force gases through the check valve into the tank thereby causing the tank to become pressurized.

2. The combination detachable charging head and pressure tank defined in claim 1 wherein an electrical pressure sensing switch and connector is disposed in the wall of said pressure tank, said electrical pressure sensing switch being connected to the firing breech with an electrical cable to interrupt the supply of cartridges to the firing breech when the pressure in the tank reaches a predetermined level.

3. The combination detachable charging head and pressure tank defined in claim 1 wherein a pneumatic pressure release switch is disposed in the wall of said pressure tank said pneumatic pressure release switch being connected to the firing breech with pneumatic tubing to interrupt the supply of cartridges to the firing breech when the pressure in the tank reaches a predetermined level.

* * * * *